(12) United States Patent
Wadensten (10) Patent No.: US 11,098,749 B2
(45) Date of Patent: Aug. 24, 2021

(54) VACUUM SUCTION CUP AND VIBRATOR

(71) Applicant: Vibco, Inc., Wyoming, RI (US)

(72) Inventor: Theodore S. Wadensten, Charlestown, RI (US)

(73) Assignee: Vibco, Inc., Wyoming, RI (US)

( * ) Notice: Subject to any disclaimer, the term of this patent is extended or adjusted under 35 U.S.C. 154(b) by 0 days.

(21) Appl. No.: 16/927,296

(22) Filed: Jul. 13, 2020

(65) Prior Publication Data
US 2021/0025439 A1 Jan. 28, 2021

Related U.S. Application Data

(60) Provisional application No. 62/877,420, filed on Jul. 23, 2019.

(51) Int. Cl.
*F16B 47/00* (2006.01)
*B06B 1/18* (2006.01)

(52) U.S. Cl.
CPC ............... *F16B 47/00* (2013.01); *B06B 1/18* (2013.01)

(58) Field of Classification Search
CPC .................................. F16B 47/00; B06B 1/18
USPC ... 248/363, 467, 205.5, 206.2, 206.4, 309.3; 425/11, 12
See application file for complete search history.

(56) References Cited

U.S. PATENT DOCUMENTS

| | | | | |
|---|---|---|---|---|
| 3,932,057 A * | 1/1976 | Wadensten | ............. | B06B 1/186 366/124 |
| 3,993,520 A * | 11/1976 | Werner | ................. | B29C 73/025 156/94 |
| 4,744,841 A * | 5/1988 | Thomas | ................ | B29C 73/025 156/73.6 |
| 4,921,411 A * | 5/1990 | Ottenheimer | ......... | B29C 73/025 156/94 |
| 7,195,217 B1 * | 3/2007 | Wadensten | ............... | B61D 7/32 248/223.41 |
| 2014/0288467 A1 * | 9/2014 | Heilman | ............. | A61H 9/0007 601/16 |

* cited by examiner

*Primary Examiner* — Muhammad Ijaz
(74) *Attorney, Agent, or Firm* — Barlow Joseph and Holmes Ltd; David Josephs (57) ABSTRACT

A vacuum suction cup assembly, including a vacuum cup, a vibration assembly, and a vibration shock absorber. The vacuum cup includes a skirt and is configured to be pressurized when placed against a surface to retain the vacuum cup against the surface in any orientation. The vibration assembly includes a vibrator; a vibration transfer plate on which the vibrator is mounted; and at least one vibration transfer blocks disposed on an opposite face of the vibration transfer plate from the vibrator, wherein the at least one vibration transfer blocks is configured and arranged to transmit a majority of the vibration forces from the vibrator to the surface. The vibration shock absorber is disposed between the vibration assembly and the vacuum cup.

11 Claims, 8 Drawing Sheets

VACUUM SUCTION CUP AND VIBRATOR

CROSS REFERENCE TO RELATED APPLICATION

This applicant is related to and claims priority to earlier filed U.S. Provisional Patent Application No. 62/877,420, entitled "VACUUM SUCTION CUP AND VIBRATOR," filed Jul. 23, 2019, the entire contents thereof is herein incorporated by reference.

BACKGROUND OF THE INVENTION

The present invention relates to a suction cup assembly and a vibrator. More specifically, the present invention relates to a vibrator that is configured for being suctioned to containers, hoppers, heavy steel plates, window glass, or the like to break up materials ratholing at specific trouble spots or in mobile applications.

Prior art suction cup vibrators suffer from shorten life and high likelihood of early release of the vibrator from the container. For example, in current devices, the vibrations are created by vibrators and those vibrations are transmitted through a skirt. The skirt is commonly, and additionally, used to create the suction attachment with the container or plate. During actuation of the vibrator, the vibration forces are transmitted through the skirt, which is often made of rubber or plastic materials, and thus can lose up to 10-20% of the forces. The loss of the vibration forces is the result of the skirt material absorbing the vibration. As a result of the skirt absorbing the vibrations, the vibrations add additional wear to the skirt which can decrease the usable life of the skirt. Additionally, or alternatively, the vibrations passing through the skirt can lead to a loss in suction pressure between the prior art device and a container. The loss in suction can cause the vibrator device to lose its grip and fall—leading to down time for the device or possible damage to the device.

In view of the above, there is a need in the art to increase the transmission efficiency of the vibrations; increase the grip strength and duration of the device; and increase the usable life of the skirt on the device.

SUMMARY OF THE INVENTION

The present invention provides a portable vacuum suction cup vibrator that can easily and effectively be used to loosen materials that have otherwise become unflowable in a container. For example, if bulk materials are located in a hopper of a train car, the bulk materials tend to settle due to the vibrations of the train car traveling over the rails over long distances. When the train has arrived at a distribution location, the bulk material may have compacted resulting in a lack of flow necessary to unload the container. While this is a common occurrence, installing permanent vibrators in train cars may not be cost effective or technically efficient. Thus, there is a present need for portable and easily installable vacuum suction cup vibrators.

This present invention advantageously eliminates vibrations passing thru the suction cup and its skirt. Thereby, the present system can increase the vibration forces passing to the structure to be vibrated by approximately 10-20%, or more, as rigid structures providing transmission of the vibration forces. The instant system can allow the suction cup to solely do the job it was designed, for with all its suction power to be used to hold it to the structure to be vibrated, and not to be a vibration transmission element. Thus, the present invention can, advantageously, increase the life of the skirt and assure a better seal between the skirt and the structure it is attached to.

Thus, there is a need for a portable vibrator that can be suctioned to containers, at specific locations on the container, efficiently transmit vibrations, with a device that will withstand the large vibrations with a long service life.

BRIEF DESCRIPTION OF THE DRAWINGS

The novel features that are characteristic of the present invention are set forth in the appended claims. However, the invention's preferred embodiments, together with further objects and attendant advantages, will be best understood by reference to the following detailed description taken in connection with the accompanying Figures in which:

FIG. 8 shows an exploded view of a third embodiment of the present invention;

DESCRIPTION OF THE INVENTION

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like proximal, distal, top, bottom, up, or down are used, they are not intended to limit the systems, devices, and methods disclosed herein. A person skilled in the art will recognize that these terms are merely relative to the system and device being discussed and are not universal.

This instant vibrator and suction cup assemblies can be used for breaking up materials ratholing or bridging in a hopper or bin by attaching the vibrator suction cup assembly directly at the trouble spot, if known or moving the suction cup vibrator assembly until the trouble spot is found. The vibrator force will loosen the material and make it flow freely. It gives the operator the advantage of easily finding the trouble spot and clearing it. The suction cup vibrator assemblies can also easily be attached to conveyors feeding bottles or cans to avoid them getting stuck in corners before getting into feeding machines. Vibrator suction cup assemblies can additionally, or alternatively, used on railroad hopper cars to help unloading the material transported in them. These are just a few examples of the uses for the instant suction cup vibrator assemblies.

In general, the various suction cups can consist of a metal frame and a flexible skirt molded to it. The flexible skirt being made of rubber or a multiple variety of plastic materials. On the body is a vacuum pump valve that can either be operated manually or automatically with compressed air to remove the air between the body and the skirt and creating a vacuum between the suction cup and the surface it is attached to.

It has been found that the vibrations being transmitted thru the skirt of the suction cup, the skirt being made of rubber or plastic materials, loses up 10-20% of its force through absorption by the skirt. The vibrations going thru the skirt also tend to make the skirt lose its seal against the surface being vibrated which causes the suction cup and vibrator to loosen its grip and fall off its mounting. Part of the vibration, created by the vibrator, is not only partly absorbed by the skirt, but the vibration intensity thru the skirt material can also tend to break it and shorten the usable life of the skirt.

Figure 1:
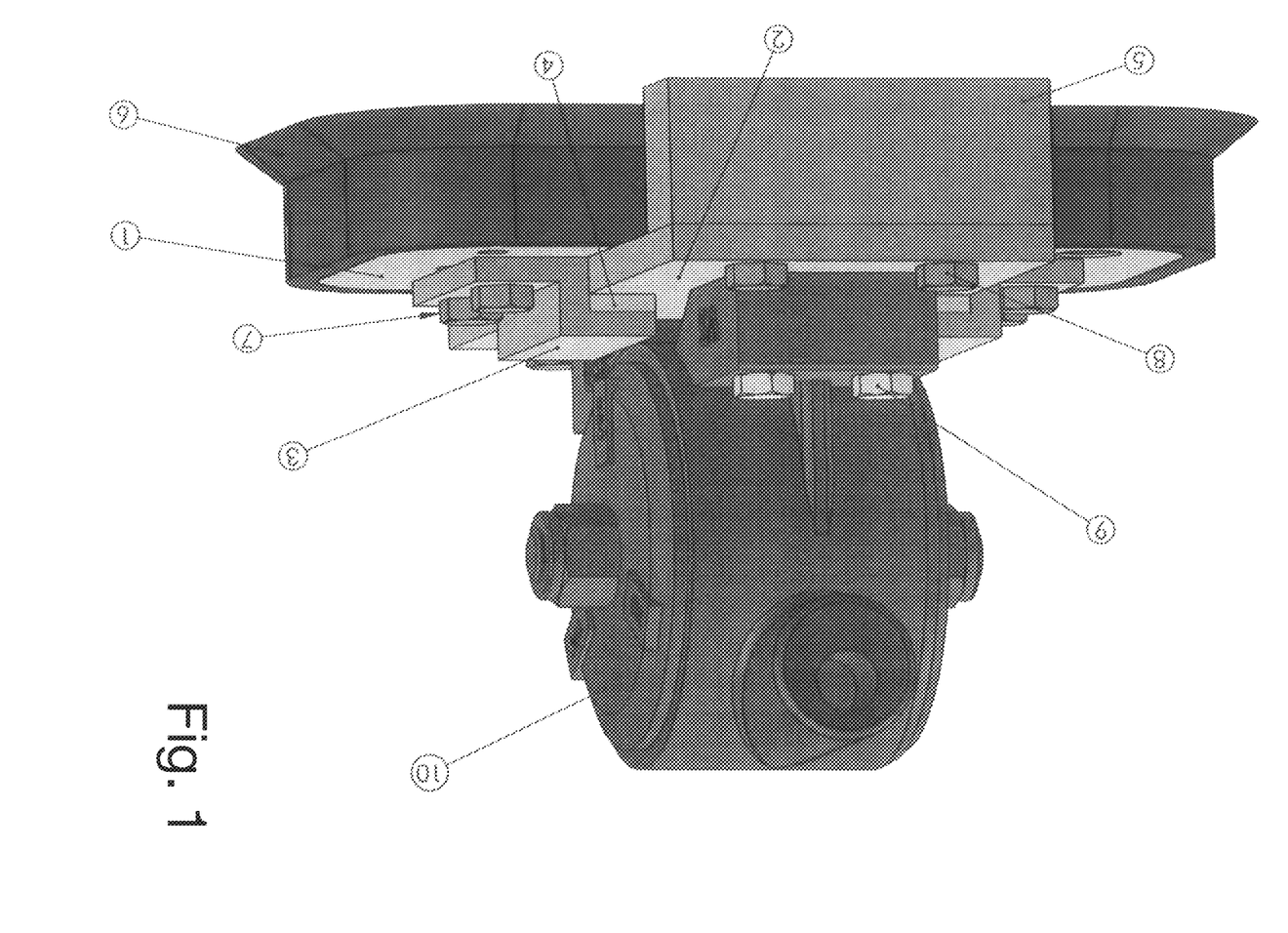
FIG. 1 shows a perspective view of a first embodiment of the present invention.
Figure 2:
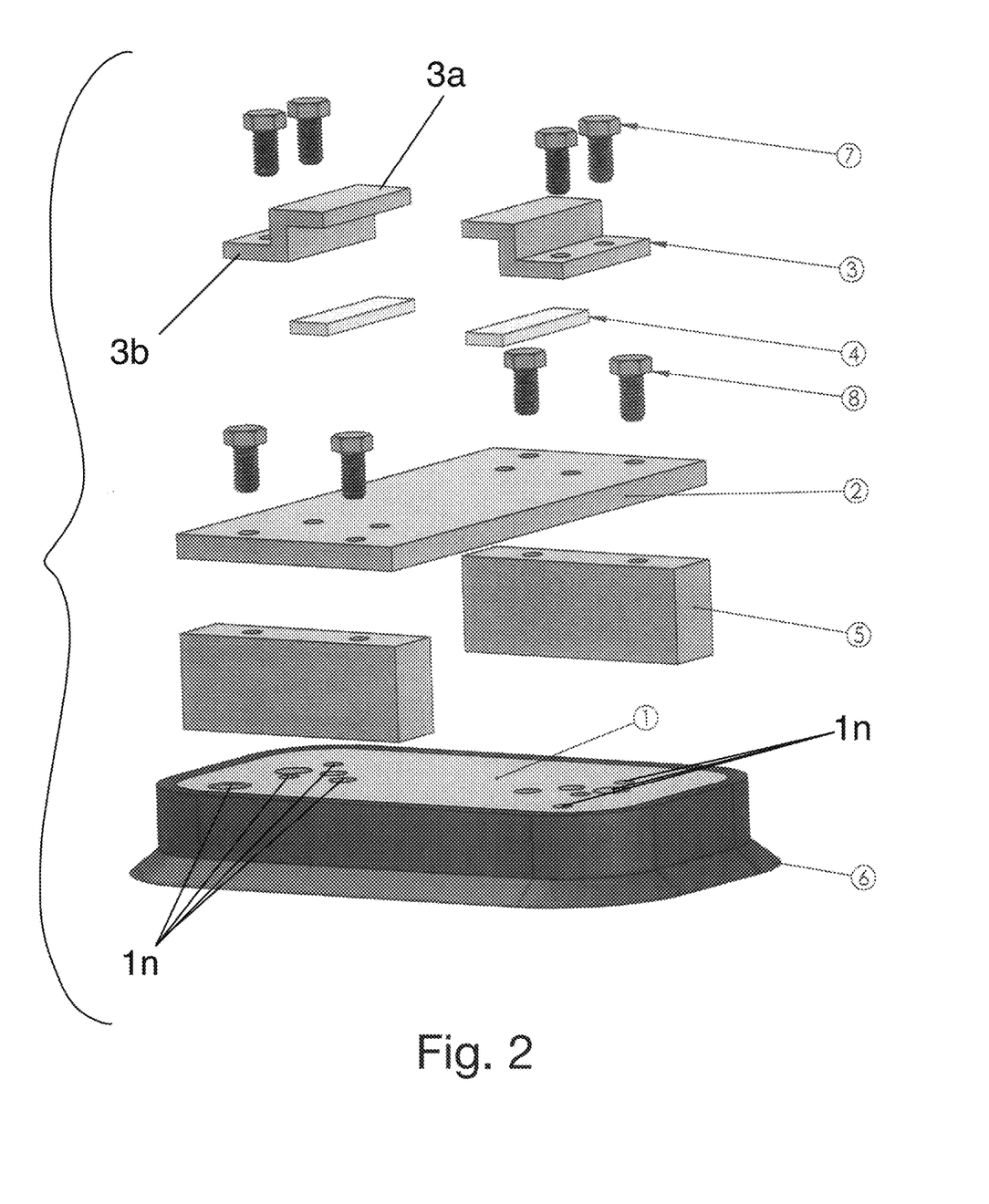
FIG. 2 shows an exploded view of a first embodiment of the present invention.

A first exemplary embodiment of a vacuum cup vibrator assembly is shown in FIGS. 1 and 2. This embodiment generally consists of a pneumatic suction cup 1, 6 and a vibrator 10. The vibrator 10 can be any known type of vibrator that is required for a given job. The pneumatic suction cup can generally include a mounting plate 1 and a skirt 6. The mounting plate 1 can, in general, include a number of mounting holes 1n which can receive bolts to secure attachments such as the aforementioned vibrator 10.

The vibrator 10 can be secured to the suction cup by a vibrator mounting plate 2 and shock absorber brackets 3. The vibrator can be directly connected to the mounting plate 2 with bolts 9, four are shown in the illustrated embodiments. The vibrator mounting plate 2 can include two vibration transfer blocks 5 that are bolted, at the distal ends, to the mounting plate 2 with bolts 8. As shown in FIG. 1, the vibration transfer blocks 5 can be generally perpendicular to the mounting plate 2. The two vibration transfer blocks 5 can straddle either side of the suction cup 1. In an alternative, the two vibration transfer blocks 5 can be located anywhere that is suitable. The vibrator mounting plate 2 and the vibration transfer blocks 5 can be made from any material which can efficiently transfer vibration forces. The vibrator mounting plate 2 can be secured to the pneumatic suction cup 1 by means of at least two shock absorbing brackets 3, which serve to limit the total vibration directly transferred from the vibrator 10 to the suction cup 1. Each of the two shock absorber brackets can be sized and shaped in the form of a "Z" shape where each of the extensions are at right angles, as shown in FIGS. 1 and 2. The two shock absorber brackets 3 can be attached to the suction cup 1, with bolts 7. The upper extension 3a of each of the two brackets 3 can include a respective shock absorber pad 4, which can be for example glued, or vulcanized to the shock absorber bracket 3 such that they are disposed between the vibrator mounting plate 2 and the bracket 3 to absorb the vibrations from the vibrator 10. The shock absorber pads 4 can absorb, most of all, the vibrations created by the vibrator 10 before they reach the skirt 6 of the suction cup 1. While rubber is preferably used for the shock absorber pad, any suitable material may be used for this purpose in accordance with the application at hand. The respective lower extensions 3b of each of the shock absorbing brackets 3 can be mounted to the suction cup 1 by means of the bolts 7 received into the bore holes 1n on the plate 1.

In use, the assembly as per FIG. 1, can be placed on the object to be vibrated. Air between the suction cup skirt 6 and object to be vibrated can be removed either manually or by using a compressed air hose attached to the suction cup vacuum pump valve (not shown), when the air pressure is turned on, it goes thru a vacuum pump valve which sucks the air out between the suction cup's body 1 and skirt 6, creating a vacuum holding the assembly firmly in place. Once the vacuum is created, the vibrator 10 can be turned on. As the vacuum is generated that force will hold the assembly firmly in place and press the vibrator mounting plate 2 against the surface to be vibrated via the vibration transfer blocks 5. The more vacuum that is created, the harder the mounting plate 2 with its vibration transfer blocks 5 will press against the object to be vibrated, preventing the vibrator and suction cup assembly from coming loose. The shock absorber brackets 3 will transfer the vacuum holding force to the vibrator mounting plate 2 and hold the entire assembly to the object to be vibrated. The shock absorber pads 4 will absorb the vibration force created by the vibrator 10 and not allow a significant amount of vibration force to be transmitted to the suction cup 1 and its skirt 6. The amount or percentage of absorption can be adjusted or modified to suit the application and desired performance hand.

Figure 3:
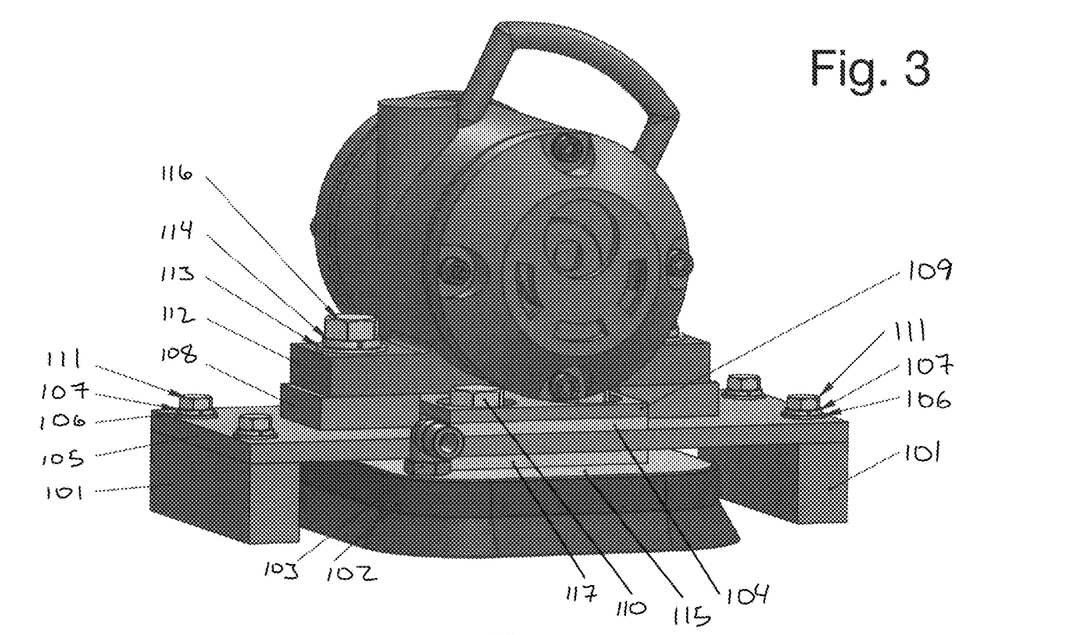
FIG. 3 shows a front perspective of a second embodiment of the present invention.
Figure 4:
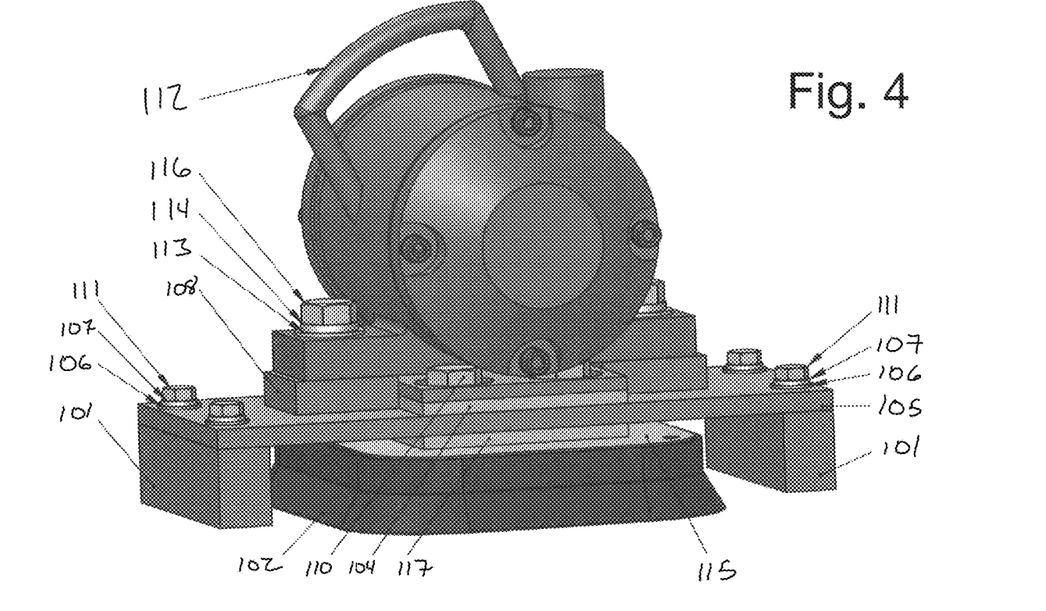
FIG. 4 shows a rear perspective the second embodiment of the present invention.
Figure 5:
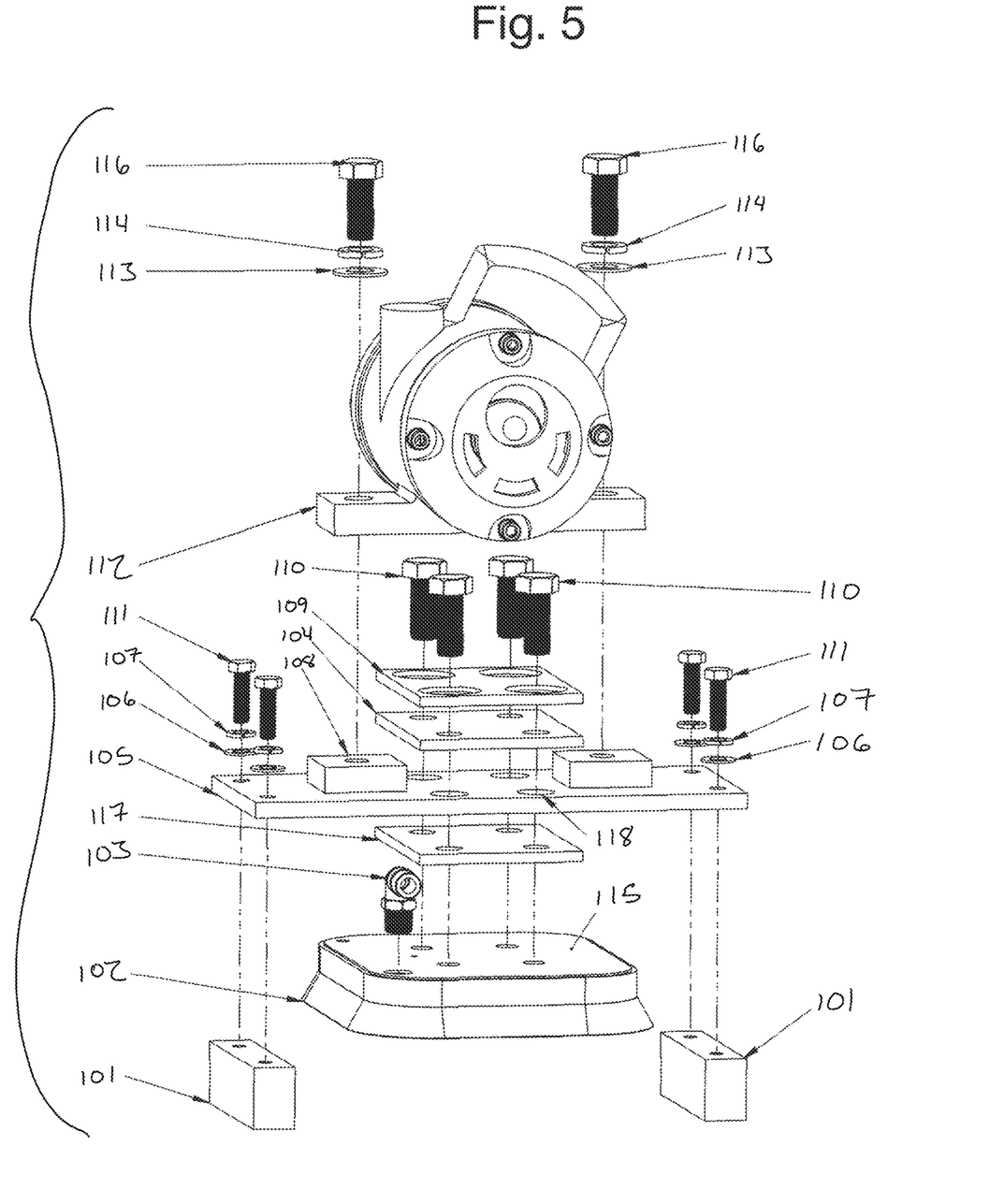
FIG. 5 shows an exploded view of a second embodiment of the present invention.

In an alternative embodiment, as shown in FIGS. 3-5, two vibration transfer blocks 101 can be attached to a vibration transfer plate 105 with flat washers 106, lock washers 107 and hex bolts 111, in that order in the illustrated embodiment. The vibration transfer plate 105 can be welded to two, or more, vibrator mounting blocks 108. The vibrator mounting blocks 108 can create a channel for a compression plate 109 and a shock absorber pad 104 to be disposed therethrough. The vibrator 112 can be mounted to vibrator mounting blocks 108 with flat washers 113, lock washers 114, and hex bolts 116. While the illustrated embodiment makes use of a combination of various washers and bolts to secure the various components together, any attachment means can be used, including welding or adhesives.

To secure the vibration transfer plate 105, and thus the vibrator 112, to the suction cup skirt 102, a shock absorbing compression assembly can be used. On the top of vibration transfer plate 105, the aforementioned rubber vibration shock absorber pad 104 can be placed, and a compression plate 109 can be placed between the rubber vibration shock absorber pads 104 and the vibrator 112. Underneath the vibration transfer plate 105 an additional rubber vibration shock absorber 117 can be placed. The compression plate 109, the absorber pads 104, vibration transfer plate 105, and shock absorber 117 can be placed, in that order, on the suction cup mounting plate 115 and secured thereto with hex bolts 10. As with the brackets 3 and pads 4 of the embodiment of FIGS. 1 and 2, the shock absorbing compression assembly can be used to isolate the suction cup mounting plate 115 and the skirt 102 from the vibration forces created by the vibrator 112.

In use, the single cup transfer block assembly can be placed on the surface to be vibrated. Compressed air can be drawn out thru a vacuum valve 103 to remove air from the cavity inside the plastic or rubber suction cup skirt 102 sealing it against the surface to be vibrated by a vacuum pressure. As the vacuum is established it collapses the rubber suction cup skirt 102 and presses the vibration transfer blocks 101 against the surface to be vibrated. The vibrator 112 can be started to transfer the vibrations thru the vibration mounting blocks 108, the vibration transfer plate 105, and vibration transfer plates 101 onto the surface to be vibrated.

As discussed above, one object of this invention is to eliminate vibration forces from passing thru the suction cup mounting plate 115 and its skirt 102. Such a transmission can create a leak in the seal between it and the surface to be vibrated loosening the complete assembly and creating a safety hazard. In prior art devices, a skirt can absorb about 20% of the force thereby allowing only 80% to be transmitted to the container. The instant embodiment of FIGS. 3-5 can prevent the vibration force from passing through the suction cup assembly 115 and 102 as the rubber vibration shock absorbers 104, 117 are sandwiched on both sides of vibration transfer plate 105 and secured to the suction cup mounting plate 115 with compression plate 109 and hex bolts 110.

In some embodiments, the holes 118 in the vibration transfer plate 105 can be made larger than the hex bolt 110 diameter to make sure the bolts 110 do not touch any part of the vibration transfer plate 5. The lack of contact between the bolts 110 and the vibration transfer plate 110 can prevent any vibration forces from being transmitted to them. Alternatively, or additionally, the hex bolts 110 can be disposed through shock absorbing sleeves as well to further prevent any transmission of forces. The hex bolts 110 can be secured tightly to avoid any movement of the rubber vibration shock absorbers 117, 104 which could cause vibration force transfer to the suction cup 115 and skirt 102.

Figure 6:
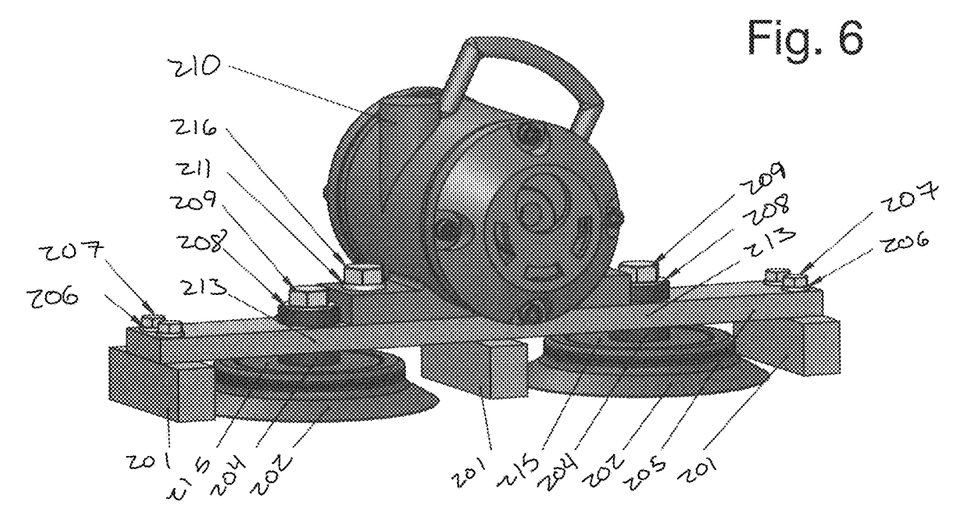
FIG. 6 shows a front perspective of a third embodiment of the present invention.
Figure 7:
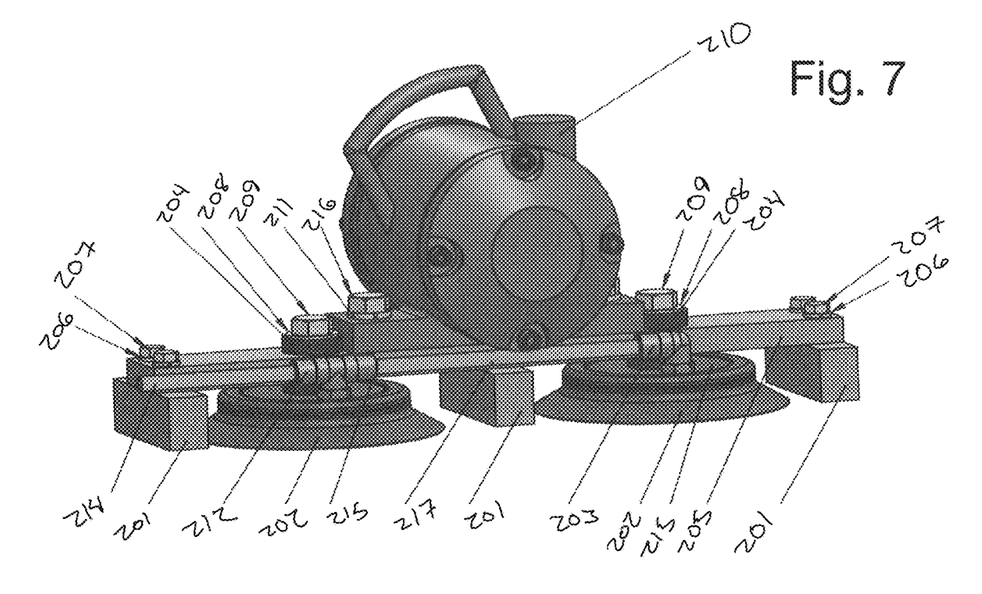
FIG. 7 shows a rear perspective the third embodiment of the present invention.
Figure 8:
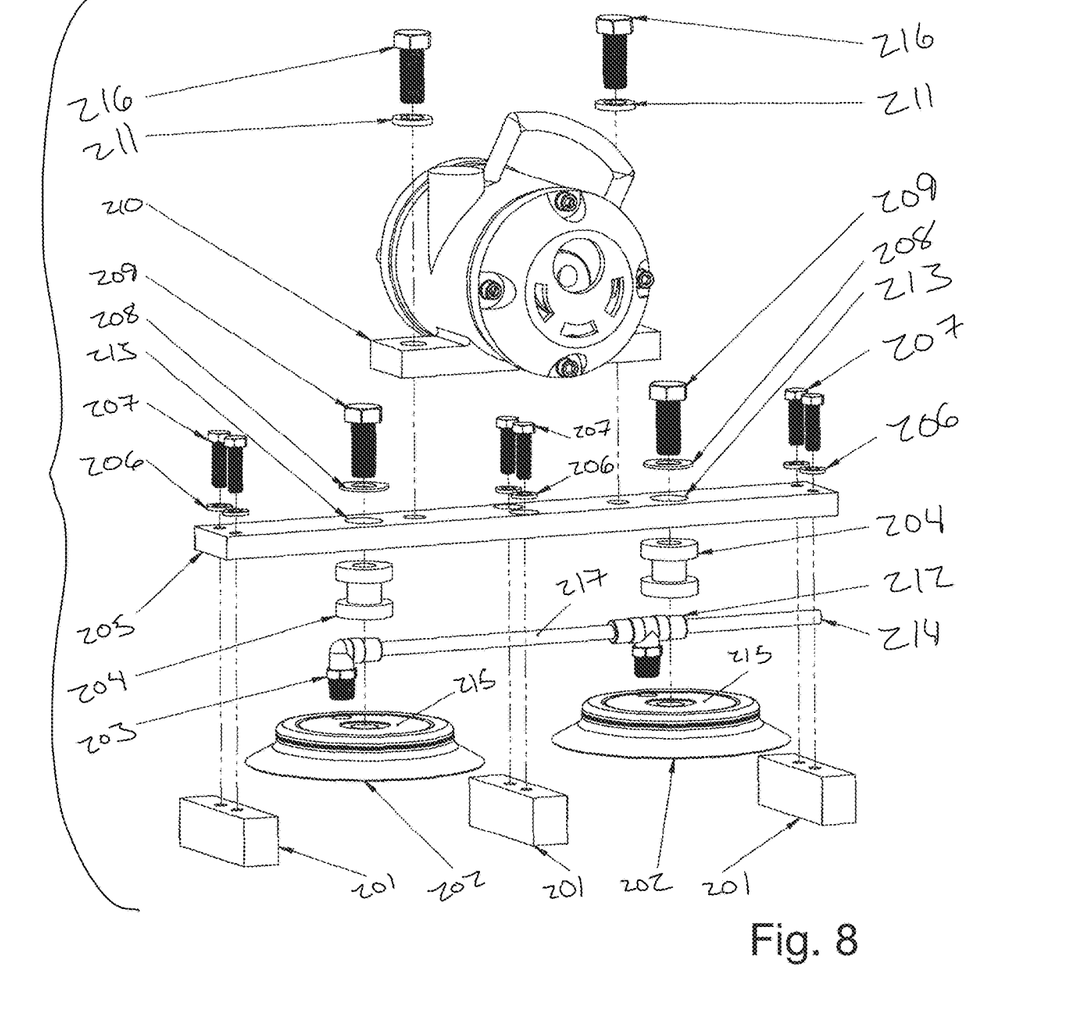

In yet another alternative embodiment, as shown in FIGS. 6-8, the vibration isolation assembly can use a two suction cup transfer block assembly. In the illustrated embodiment, three transfer blocks 201 can be attached to the vibrator mounting plate 205 with lock washers 206 and hex bolts 207, in a similar fashion to the embodiment of FIGS. 3-5. A vibrator 210 can be connected to the vibrator mounting plate 205 with lock washers 211 and hex bolts 216. In contrast with the embodiment of FIG. 3-5, the vibrator can be disposed directly on the vibrator mounting plate 205, without any spacers.

The instant embodiment employs a similar, though alternative, assembly to isolate the two suction cups 2 from the forces created by the vibrator 210. As shown in FIG. 8 for example, the two respective suction cups 202 can be mounted to the vibrator mounting plate 205 with a respective hex bolt 209 having a flat washer 208 that can pass through a rubber grommet shock absorber 204. As shown, the rubber grommet shock absorber 204 can have a generally "spool" shape having a top and bottom portions which have a larger diameter than the central body portion to act as shock absorbing washers, where the larger diameter portions sandwich the vibrator mounting plate 205. The rubber grommet shock absorber 204 can fit through respective holes 213 in the vibrator mounting plate 205 to attach to the vacuum cup mounting plate 215. The rubber grommet shock absorber 204 functions to isolate the suction cups 202 from any vibration forces.

An elbow push lock 203 for vacuum tubing 217 can be connected through a suction cup mounting plate 15 to a first vacuum cup skirt 202. The vacuum tubing 217 can be connected to a T-push lock 212 for vacuum tubing and a vacuum tube 214. The elbow push lock 203, tubing 214, 217, and the T-push lock 212 can be used to create the vacuum source required to secure the suction cups to a container by means of a vacuum pump. Such a configuration of vacuum tubing and push locks is but one example of a tubing configuration.

In use, the two-cup transfer block assembly can be placed on the surface to be vibrated. Compressed air can be removed thru the push lock valves 203, 212 to removing air from the cavity inside the plastic or rubber skirts 202 sealing them against the surface to be vibrated and a vacuum is thereby established. As the vacuum is created, the skirts 202 can collapse and press the vibration transfer blocks 201 against the surface to be vibrated. The vibrator 210 can then be started. The force created by the vibrator 210 can be transferred through the vibration mounting plate 205 and through to each of the vibration transfer blocks 201 to the surface to be vibrated. The object for this invention is to eliminate vibration forces that are passed to the suction cups and their skirts 202, which can create a leak in the seal loosening the complete assembly and creating a safety hazard.

To prevent the vibration force from passing through the suction cup assemblies 202, the rubber grommet shock absorbers 204 can be inserted into holes 213 on vibration mounting plate 205. An upper flange of the grommets 204 can be disposed on top of the vibration mounting plate 205 and a bottom flange of the grommets 204 can be disposed on the bottom side of vibration mounting plate 205. The neck of the grommet 4 can connect the two flanges. A flat washer 208 can be placed on the top flange of the grommets 204 and a hex bolt 209 can be inserted through the flat washers 208 and grommet 204 and secured to the suction cup mounting plate 215. The rubber grommet shock absorbers 204 can isolate the vibration force from travelling thru to the suction cup skirt 202.

Figure 9:
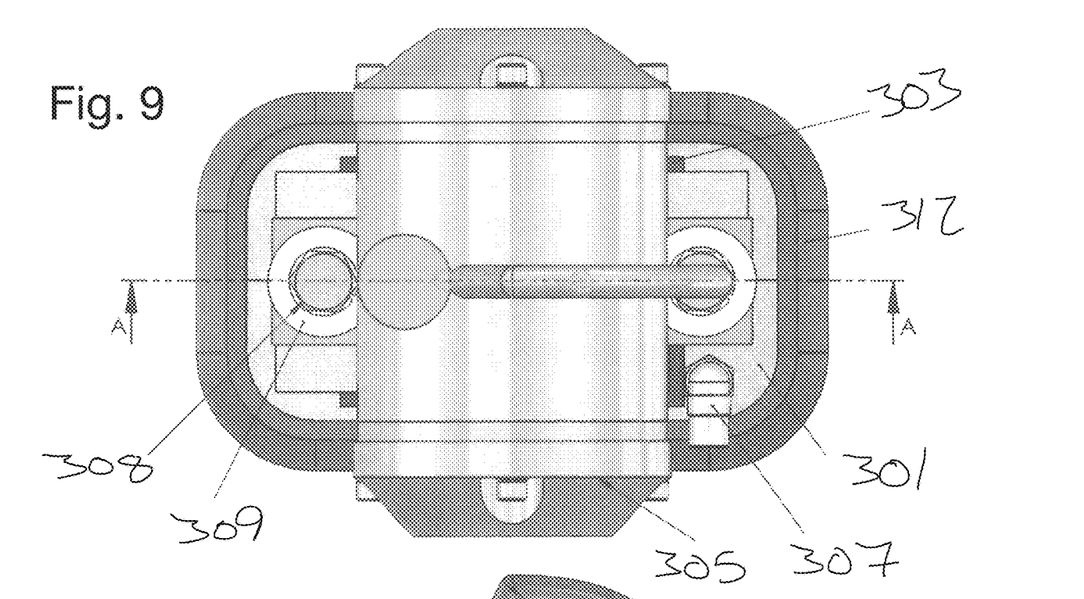
FIG. 9 shows a top view of a fourth embodiment of the present invention.
Figure 10:
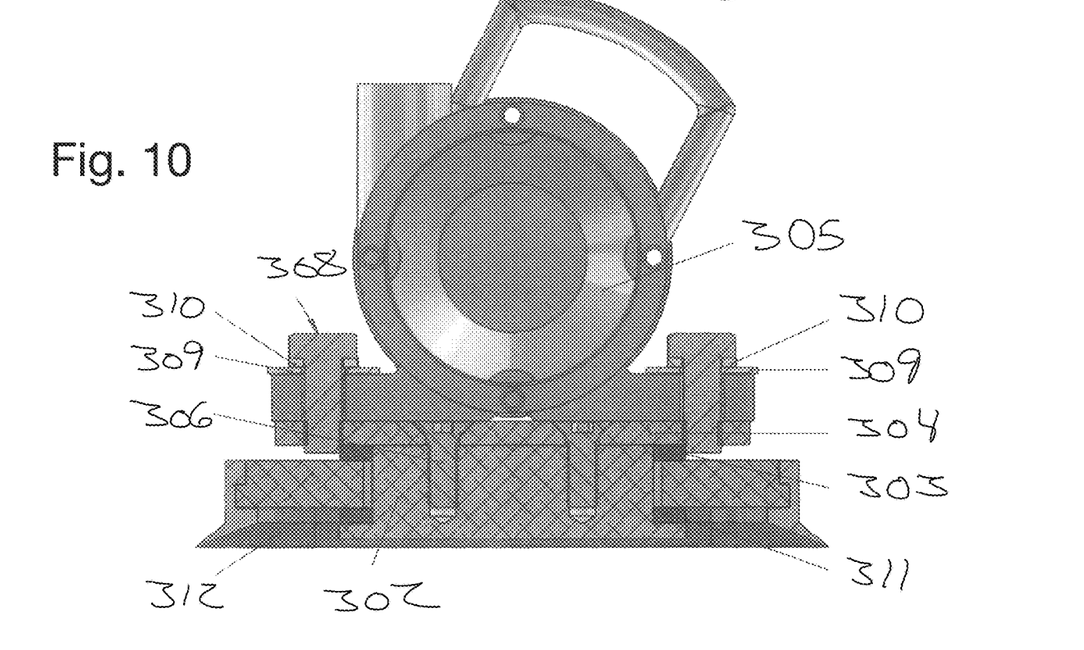
FIG. 10 shows a partial cross-sectional view the fourth embodiment of the present invention through line A-A.
Figure 11:
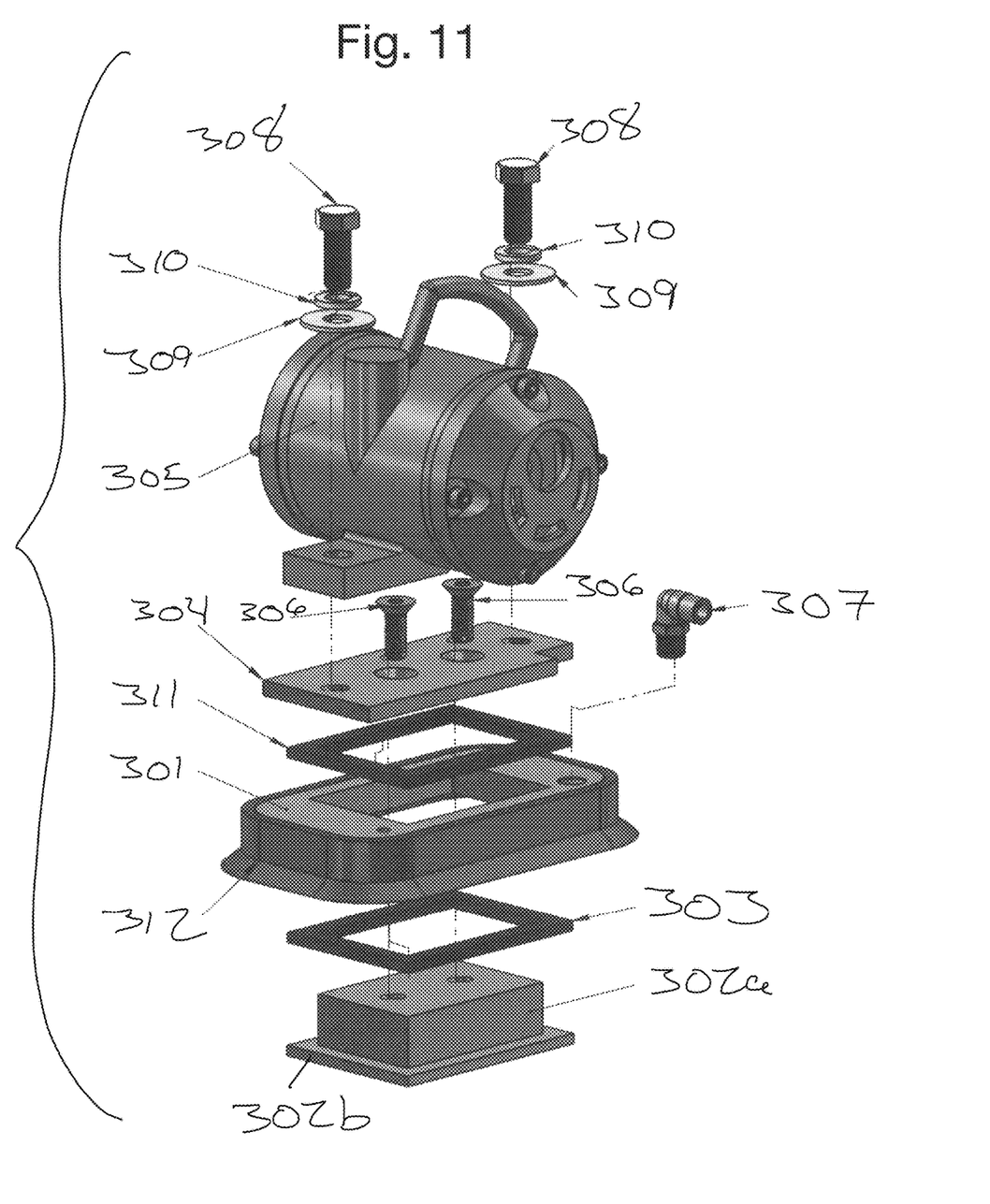
FIG. 11 shows an exploded view of a fourth embodiment of the present invention.

In a further alternative embodiment, shown in FIGS. 9-11, the general arrangement of a vibrator and suction cup assembly is provided. The instant embodiment differs from the prior embodiments in that vibration transfer block(s) 302 can be disposed within a perimeter defined by the suction cup skirt 312. To prevent vibration forces from the vibrator 305 passing directly to the suction cup assembly 301, 312, at least one shock absorber 311 is placed between suction cup frame 1 and a vibrator mounting plate 4. The vibrator 305 can be secured to the vibrator mounting plate 304 with mounting bolts 308, lock washers 310, and flat washers 309. The vibrator mounting plate 304, in turn, can be attached to the vibration transfer block 302 with flat head socket mount screws 306. The vibration transfer block 302 can slide inside an opening in the suction cup frame 301 and in the shock absorbers 311, 303. The interior opening in the suction cup frame 301 can have a first larger area, the shock absorbers 311, 303 can have an exterior surface that is smaller than the interior of the suction cup frame 301, and the shock absorbers 311, 303 can have interior openings that are larger than the perimeter of the upper portion of the vibration transfer block 302. The vibration transfer block 302 can have an upper portions 302a which can have a smaller area than the openings in the shock absorbers 311, 303 and the suction cup frame 301 to prevent transfer of any forces. Moreover, the lower portion 302b which contacts the container to be vibrated, can create a lip to retain the lower shock absorbers 311 against the suction cup frame 301. The shock absorbers 311, 303 can prevent the vibration forces from being transmitted from the vibration transfer block 302 to the suction cup frame 301 and the skirt 312. The shock absorbers 311, 303 can also act as seals to prevent air leaks into the vacuum.

In use, the vibration transfer block 302 that is inside suction cup assembly 301, 312 can be placed above the surface to be vibrated. Air can be removed from the skirt 312 through a vacuum line fitting 307 to remove air from the cavity inside the plastic or rubber skirt 312, thereby sealing it against the surface to be vibrated due to the vacuum being created. As the vacuum is established, the skirt 312 can collapse and press the vibration transfer block 302 against the surface to be vibrated. The vibrator 305 can then be started. The vibration forces created by the vibrator 305 can be transferred thru the vibrator mounting plate 304 thru the head mount screws 306 attached to the vibration transfer block 302 and into the surface to be vibrated.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

The invention claimed is:

1. A vacuum suction cup assembly, comprising:
a vacuum cup;
a vibration assembly, including a vibrator, disposed on the vacuum cup; and
a vibration shock absorber disposed between the vibration assembly and the vacuum cup,
wherein the vibration assembly is configured and arranged to eliminate transmission of vibration forces, from the vibrator to a surface, through the vacuum cup.

2. The vacuum suction cup assembly of claim 1, wherein the vacuum cup includes a skirt, the vacuum cup being configured to be pressurized when placed against a surface to retain the vacuum cup against the surface in any orientation.

3. The vacuum suction cup assembly of claim 2, wherein the vacuum cup is configured to be pressurized by an external pressure source.

4. The vacuum suction cup assembly of claim 1, wherein the vibration assembly further includes,
a vibration transfer plate on which the vibrator is mounted; and
at least one vibration transfer block disposed on an opposite face of the vibration transfer plate from the vibrator.

5. The vacuum suction cup assembly of claim 4, wherein the at least one vibration transfer block is a plurality of transfer blocks.

6. The vacuum suction cup assembly of claim 4, wherein the vacuum assembly further comprises a second suction cup.

7. The vacuum suction cup assembly of claim 6, further comprising a second vibration shock absorber,
wherein the vibration shock absorber is disposed between the vibration transfer plate and the suction cup, and
wherein the second vibration shock absorber is disposed between the vibration transfer plate and the second suction cup.

8. The vacuum suction cup assembly of claim 1,
wherein the vacuum cup includes a suction cup skirt and a suction cup frame supporting the suction cup skirt, the suction cup frame having an opening disposed therethrough, and
wherein the vibration assembly further includes a vibration transfer block disposed through the opening and within the suction cup skirt.

9. The vacuum suction cup assembly of claim 8, the vibration assembly further comprising,
a vibration transfer plate having the vibrator disposed on an upper surface thereof and the vibration transfer block disposed on a lower surface of the vibration transfer plate;
the vibration shock absorber disposed between the lower surface of the vibration transfer plate and the suction cup frame; and
a second vibration shock absorber disposed between the suction cup frame and a lower lip of the vibration transfer block.

10. The vacuum suction cup assembly of claim 1, wherein the vibration shock absorber is a plurality of vibration shock absorbers.

11. The vacuum suction cup assembly of claim 1, wherein the vibrator is not directly connected to the suction cup.

* * * * *